Patented May 5, 1925.

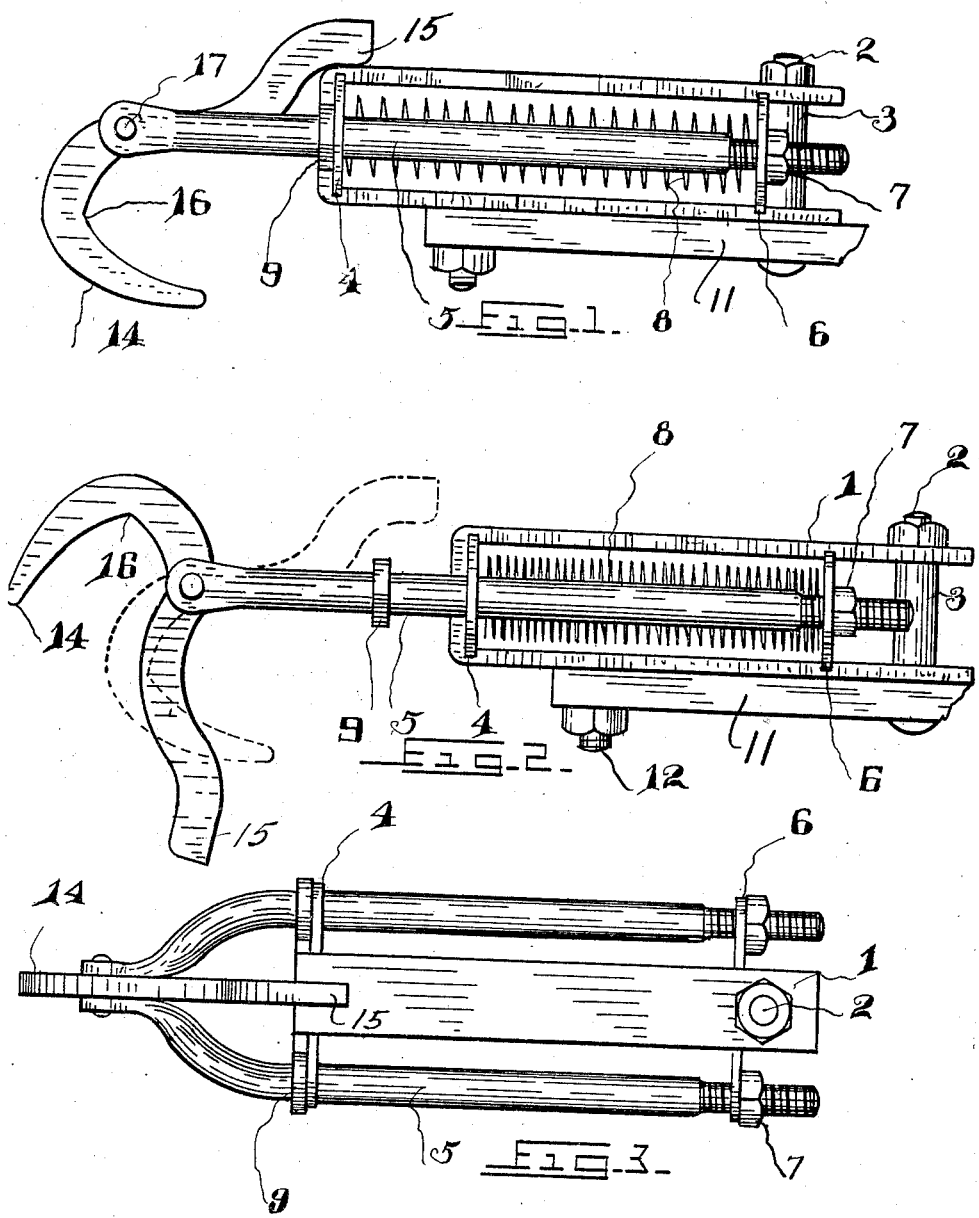

1,536,656

UNITED STATES PATENT OFFICE.

GEORGE WESLEY BRYANT, OF ASHBURN, ONTARIO, CANADA.

DRAFT BREAK HOOK.

Application filed August 29, 1924. Serial No. 734,998.

*To all whom it may concern:*

Be it known that I, GEORGE W. BRYANT, of Ashburn, in the county of Ontario, Province of Ontario, Canada, a subject of the King of Great Britain, have invented certain new and useful Improvements in Draft Break Hooks, of which the following is a specification.

This invention relates to draft hooks adapted particularly for use with tractor drawn farm implements to disconnect the implement from the tractor, and thus avoid breakage, in case the former strikes an obstruction, and my object is to devise a hook which, when interposed in the draft connections, will be substantially in the line of draft, which will release the moment a predetermined maximum strain on the draft connections is exceeded, and which after release automatically returns to its normal position ready for re-connection.

I attain my object by means of the constructions hereinafter described and illustrated in the accompanying drawings in which—

Fig. 1 is a side elevation of my improved break hook in normal position;

Fig. 2 a similar view showing the same in tripped position; and

Fig. 3 a plan view.

In the drawings like numerals of reference indicate corresponding parts in the different figures.

1 is a frame formed of a metal bar bent to U-form, its rear ends being connected by a bolt 2 passing through a spacer 3. At the forward end is located a crosshead 4, preferably formed of a single piece notched to partly receive the opposite ends of the frame. Through this cross head pass the rods 5. The rear ends of these rods pass through a crosshead 6 notched to fit over the parts of the frame 1 and to slide therebetween, their ends being threaded to receive the nuts 7. Between the two crossheads is fitted a coil spring 8. The rods 5 have shoulders 9 formed thereon bearing against the outer side of the crosshead 4. It is evident that by adjusting the nuts 7 any desired tension may be placed on the spring 8. The lower side of the frame 1 is bolted to the draft connection 11 by means of the bolt 12 and the bolt 2. A brace leads from the upper end of the bolt 2 rearwardly for connection with the draft connection 11. This connection, being well known in the art, is not shown.

The outer ends of the rods 5 are brought close together and between them is pivoted the hook 14, which faces downwardly and rearwardly. On this hook is formed or connected the tail 15, which is bent upwardly to engage over the top of the frame 1. The throat 16 of the hook, it will be noted, is in substantial alinement with the draft connection 11 so that when the hook is engaged with the draw bar of a tractor, the draft on the hook is in substantial alinement with the draft connection. The pivot 17 of the hook is located sufficiently far in front of the frame 1 that the hook 14 will swing at all times freely past the end of the frame. Normally, however, the tail engages on top of the frame and the hook and tail are so proportioned that their center of gravity lies between the pivot 17 and the end of the frame so that the parts tend to remain in the position shown in Fig. 1.

It is evident that if a pull be applied to the hook sufficient to overcome the tension of the spring 8 that the rods will slide longitudinally until such time as the end of the tail will rock by the end of the frame, thus releasing the hook from the draft member to which it is connected. The pull of the member during this operation throws the hook and tail completely round until the parts re-assume the position shown in Fig. 1. The parts are thus immediately restored to operative position after the connection has been broken. The operator, after he has disengaged his implement from the obstruction which has caused the trouble, finds everything in position ready to reconnect.

What I claim is:

1. A break-hook comprising a frame adapted to be secured to a draft connection; a pair of rods slidably mounted at opposite sides of the frame and extending forwardly of the same; a coil spring normally in compression mounted in and bearing at one end against the frame; a cross head to which the rods are connected bearing against the other end of the spring; a hook pivotally mounted between the forward ends of the rods, the throat of said hook being substantially in line with the aforesaid draft connection; and a tail on said hook extending towards the frame and normally resting on top thereof but adapted to swing by the frame when the rods move a sufficient distance against the compression of the spring, the hook being proportioned to swing by the end of the frame when the rods are in normal position relative to the frame.

2. A break-hook comprising a frame adapted to be secured to a draft connection; a pair of rods slidably mounted at opposite sides of the frame and extending forwardly of the same; a coil spring normally in compression mounted in and bearing at one end against the frame; a cross head to which the rods are connected bearing against the other end of the spring; a hook pivotally mounted between the forward ends of the rods, the throat of said hook being substantially in line with the aforesaid draft connection; and a tail on said hook extending towards the frame and normally resting on top thereof but adapted to swing by the frame when the rods move a sufficient distance against the compression of the spring, the hook being proportioned to swing by the end of the frame when the rods are in normal position relative to the frame, the hook with its tail also being so proportioned that the center of gravity thereof lies between the pivot of the hook and the end of the frame when the parts are in normal position.

3. A break-hook comprising a frame adapted to be secured to a draft connection; a pair of rods slidably mounted at opposite sides of the frame and extending forwardly of the same; a coil spring normally in compression mounted in and bearing at one end against the frame; a cross head to which the rods are connected bearing against the other end of the spring; a hook pivotally mounted between the forward ends of the rods, the throat of said hook being substantially in line with the aforesaid draft connection; and a tail on said hook extending towards the frame and normally resting on top thereof but adapted to swing by the frame when the rods move a sufficient distance against the compression of the spring, the hook being proportioned to swing by the end of the frame when the rods are in normal position relative to the frame, the frame aforesaid comprising a flat bar bent to U-shape and having a separate cross head located at the bend through which the rods pass.

Signed at Whitby, Ont., this 20th day of August 1924.

GEORGE WESLEY BRYANT.